(12) United States Patent
Obata

(10) Patent No.: US 6,282,388 B1
(45) Date of Patent: Aug. 28, 2001

(54) IMAGE FORMING APPARATUS AND IMAGE FORMING METHOD WITH PRECEDENT PRE-OUTPUT PROCESSING OF A PRINT START COMMAND

(75) Inventor: Satoshi Obata, Yokohama (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,723

(22) Filed: Feb. 18, 2000

(51) Int. Cl.[7] .................................................. G03G 15/00
(52) U.S. Cl. ................................................. 399/82; 399/85
(58) Field of Search .................................. 399/82, 75, 81, 399/83, 85, 87, 23, 391; 347/262; 358/1.12, 1.15; 395/113, 114, 826, 860, 874

(56) References Cited

U.S. PATENT DOCUMENTS 5,983,051 * 11/1999 Mishima et al. ........................ 399/83
6,097,500 * 8/2000 Fromherz ............................... 358/1.8
6,125,242 * 9/2000 Yamada ............................... 399/85 X

* cited by examiner

Primary Examiner—Arthur T. Grimley
Assistant Examiner—Hoan Tran
(74) Attorney, Agent, or Firm—Foley & Lardner

(57) ABSTRACT

In a precedent pre-output processing of a print start command in a digital reproducing apparatus, a print start command is saved in a command queue in an engine control task, and a next sheet feed start command is transmitted immediately after a termination command indicating sheet feed of a sheet which is being processed is received from a mechanism control section. Furthermore, the precedent pre-output of a print start command is performed even when sheet feed positions are different corresponding to a preceding sheet and a following sheet in such a case of printing in a cover sheet mode or printing using an automatic duplex unit. In this case, the digital reproducing apparatus does not transmit the command which has been precedently pre-output to a mechanism control section and notifies a print control task of no transmission of the command as cancellation of the print start command, thereby preventing the next sheet from being printed at a time of occurrence of sheet empty.

12 Claims, 9 Drawing Sheets

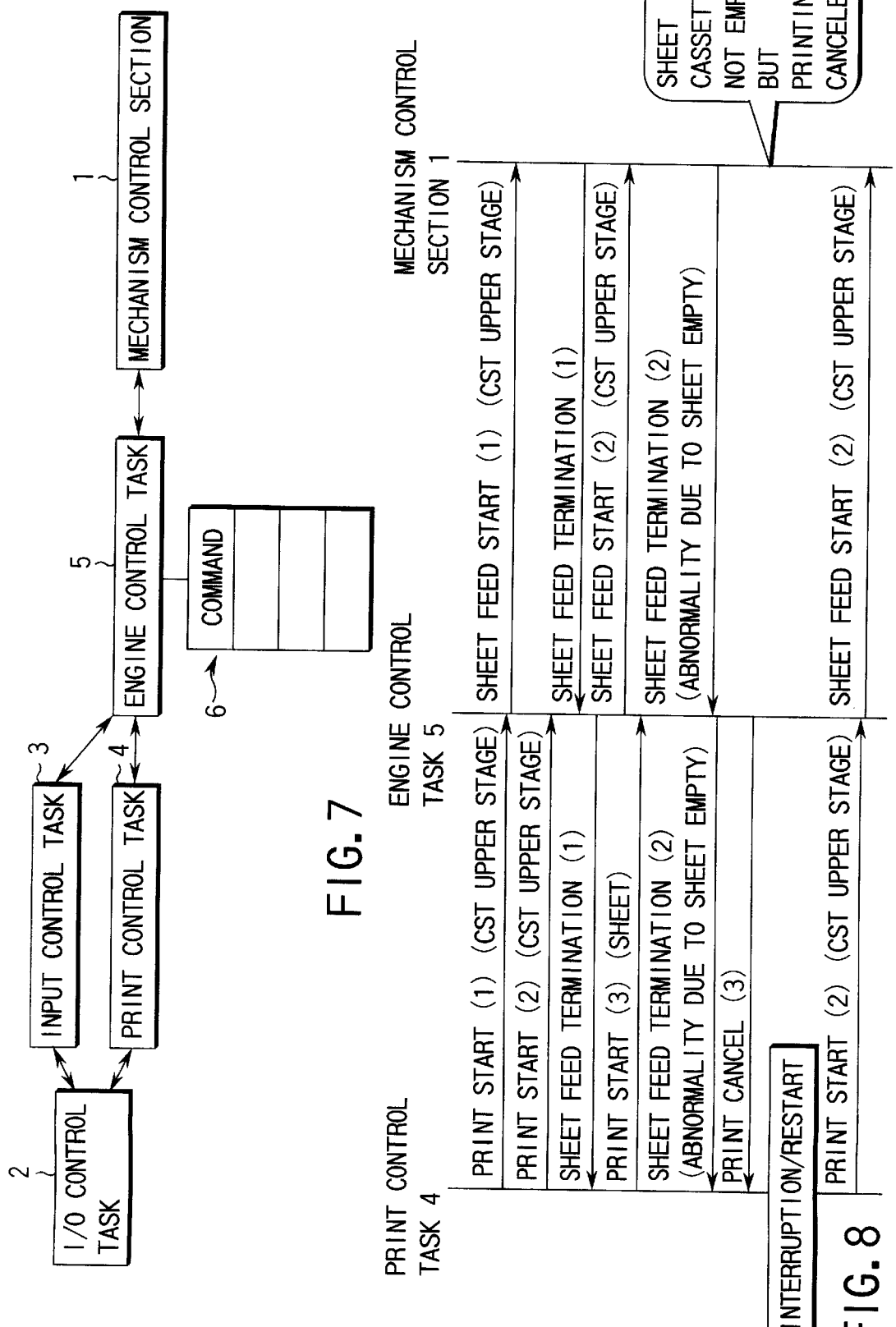

| | | (2) | (4) | (1) | (6) | (3) | (8) | (5) | (10) | ...... |
|---|---|---|---|---|---|---|---|---|---|---|
| BEFORE CHANGE | SHEET FEED POSITION | CST | CST | 2 ADU | CST | 4 ADU | CST | 6 ADU | CST | ...... |
| AFTER CHANGE | SHEET FEED POSITION | (6) CST | (8) CST | (5) 6 ADU | (10) CST | (7) 8 ADU | (12) CST | | | ...... |

IMAGE FORMING APPARATUS AND IMAGE FORMING METHOD WITH PRECEDENT PRE-OUTPUT PROCESSING OF A PRINT START COMMAND

BACKGROUND OF THE INVENTION

The present invention relates to an image forming apparatus and an image forming method where a stackless type automatic duplex unit (stackless type ADU) is provided and duplex alternating print control is performed to form images.

Conventionally, in an image forming apparatus, for increasing a printing speed, it is very important to shorten a distance (inter-sheet space) between adjacent sheets or papers to be sequentially printed. In order to shorten the inter-sheet space, it is required that, immediately after feeding a sheet which is being processed is completed and the next sheet is allowed to be fed, an instruction for feeding the next sheet is issue such that feeding the next sheet can be started as early as possible.

On the other hand, in an image forming apparatus such as a current digital copier or reproducing apparatus, a reproducing function is not only provided but also a multi-function including a facsimile function, a LAN printer function and the like has been extended, so that the volume of system software tends to increase. In development of increasing system software, a technique has been taken where a software is divided as one task for each function of the software including an input/output function, a print function, a job management function, an engine control function and the like, and development is performed for each function. Thus, by dividing the software for each function, complexity in each divided software corresponding to each function can be reduced, thereby facilitating development thereof.

In an image forming apparatus with such a task configuration, a technique where a precedent pre-output (so-called precedent throwing) of a print start command is performed has been employed as a technique for shortening an inter-sheet space. The precedent pre-output (precedent throwing) of a print start command means that, before execution of a print start command for one page is completed or terminated, a print start command for the next page is prepared and output in advance.

In a lower level module, the print start command for the next page which has been pre-output in advance is saved, and upon termination or completion of processing on the page which is being processed, the saved command is executed, so that time loss due to communication for command transmission/reception can be reduced.

For example, in a system with such a configuration including a print control task, an engine control task and a mechanism control section, a command queue is prepared in the engine control task, a precedent pre-output command issued form the print control task is saved in the queue. Immediately after the mechanism control section is put in a state capable of executing a command, it executes command, so that the precedent pre-output processing can be realized.

FIG. 1 is a diagram showing a sequence of print start executed when a precedent pre-output is not performed. As a print control section transmits a print start (command) (2) to an engine control section after a sheet feed completion (command) (1) is received, communication loss between tasks occurs.

FIG. 2 is a diagram showing a sequence of print start executed when a precedent pre-output is performed. The print control section transmits a print start (command) (2) to the engine control section before a sheet feed completion (command) (1) is received. As a result, the engine control section performs preparation for transmission of a sheet feed start command and, upon reception of the sheet feed completion (command) (1), can start execution of a paper feeding (command) (2).

However, in the precedent pre-output processing of the print start command, there occurs a problem in a case that a sheet feed position is changed in the course of execution of sequential print jobs in such a case as a cover sheet insertion, a sheet insertion or duplex printing.

For example, as shown in FIG. 3, a print job is assumed that sheets for a page (1) and a page (2) are fed from an upper stage cassette (CST upper stage) and a sheet for a page (3) is fed from a lower stage cassette (CST lower stage). At this time, a situation is further assumed that there is only one sheet in the upper stage cassette so that a sheet feed for the page (2) can not be performed due to paper empty. In this case, execution of a paper feeding start command for the page (2) results in an abnormal termination due to paper empty, but a print start command for the page (3) has been already pre-output when the abnormal termination is notified. Therefore, since a position for feeding a sheet for the page (3) is different from that of the empty cassette, the sheet for the page (3) is normally fed and printing for the sheet is started. As a result, printing is not performed on the paper for the page (2) but printing is performed on the paper for the page (3) is printed, so that printing can not be performed in a proper page order.

For this reason, conventionally, in a case that sheet feed cassette positions are changed, processing has been performed where, until execution of a command for sheet feed which is currently being executed is normally terminated, issue of the next command is stopped. That is, when the sheet feed cassette positions are changed, the precedent pre-output processing has not been performed.

However, when a duplex alternating print control using a stackless type automatic duplex unit (stackless type ADU) is performed, printing positions are changed alternately in the order of the cassette, the ADU, the cassette, and the ADU, as a printing order shown in FIG. 4. Accordingly, a precedent pre-output can not be performed for each printing, which results in deterioration of printing efficiency.

BRIEF SUMMARY OF THE INVENTION

An object of the present invention is to provide an image forming apparatus and an image forming method capable of achieving both improvement of printing efficiency obtained by a precedent pre-output processing of a print command and interruption/restart of printing at a time of sheet empty.

In order to attain the above object, the present invention is to provide an image forming apparatus comprising image forming means for forming an image on a sheet which is fed on the basis of image data; operation control means for controlling operations of the image forming means including a sheet feed operation responding to a sheet feed start command, when the sheet feed start command is received; first control means for precedently pre-outputting a next image forming start command for forming an image in the image forming means before a sheet feed termination command is received from the operation control means; and second control means for registering the next image forming start command in a command queue when the next image forming start command is received, outputting another sheet feed start command to the operation control means in response to the next image forming start command which has been registered in the command queue when a sheet feed termination command is received, and outputting a cancel command for canceling the next image forming start command which has been registered in the command queue when a paper feeding abnormal termination message is received form the operation control means.

The present invention is an image forming method comprising a first step of controlling image forming operations including a sheet feed operation responding to a sheet feed start command when the sheet feed start command is received; a second step of precedently pre-outputting a next image forming start command before a sheet feed termination command output as a result of control of the paper feeding operation in the first step; a third step of registering the next image forming start command in a command queue when the next image forming start command which has been precedently pre-outputted in the second step is received; a fourth step of outputting another sheet feed start command responding to the next image forming start command which has been registered in the command queue in the third step when a sheet feed termination command output as a result of the sheet feed operation in the first step is received; and a fifth step of canceling the next image forming start command which has been registered in the command queue in the third step when a sheet feed abnormal termination message output as a result of the sheet feed operation in the first step is received.

BRIEF DESCRIPTION OF THE SEVERAL VIEWS OF THE DRAWING

FIG. 7 is a diagram showing a relationship between a task configuration and a mechanism control section of the digital reproducing apparatus;

FIG. 8 is a diagram showing a sequence of a precedent pre-output control executed when a sheet empty state occurs in a case where a sheet feed position is changed;

DETAILED DESCRIPTION OF THE INVENTION

An embodiment of the present invention will be explained with reference to the drawings.

Figure 5:
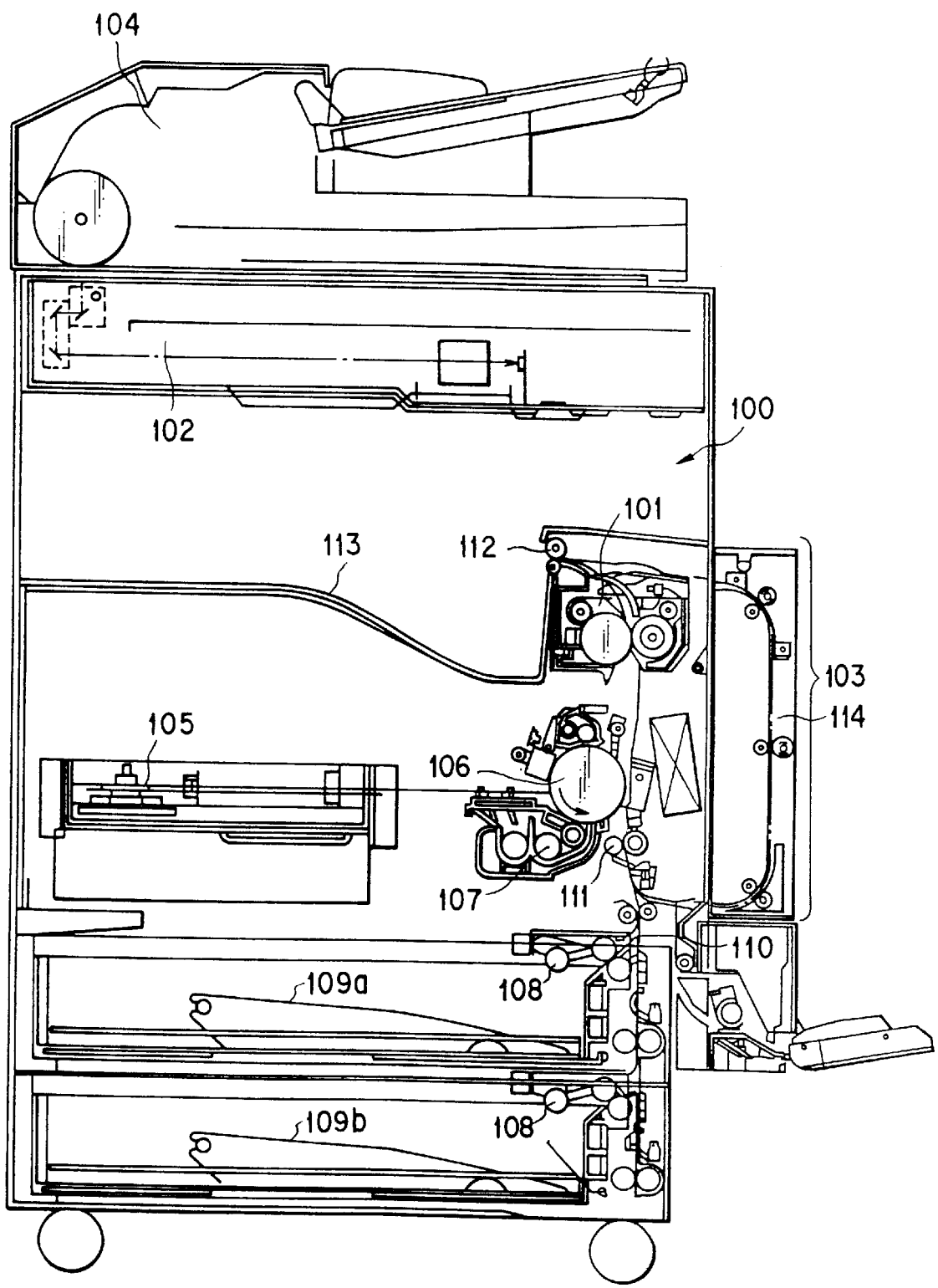
FIG. 5 is a front view showing a schematic structure of a digital reproducing apparatus according to an image forming apparatus of the present invention.

FIG. 5 shows a schematic configuration or structure of a digital reproducing apparatus 100 according to an image forming apparatus of the present invention. That is, the digital reproducing apparatus 100 comprises a scanner 102 for reading image information of a book or any sheet of sheet-shape original document which is a subject (medium) to be reproduced as brightness (intensity) of light to generate an image signal, and an image forming section 103 for forming an image corresponding to an image signal which is supplied from the scanner 102 or externally (from an external device). Incidentally, the scanner 102 is integrally assembled with an automatic document feeder (ADF) 104 for sequentially feeding subjects to be reproduced in an interlocking manner with image reading operation in the scanner 102 when the subjects are sheet-shaped.

The image forming section 103 comprises an exposing device 105 for irradiating laser beam corresponding to image information supplied from the scanner 102 or an external device, a photosensitive drum 106 on which an image corresponding to the laser beam from the exposing device 105 is formed and supported, a developing device 107 for supplying developer to develop the image formed on the photosensitive drum 106, a fusing or fixing device 101 for heating and fusing an developer image which has been developed on the photosensitive drum 106 by the developing device 107 and which has been transferred on a transferring material fed by a sheet conveying section described later to fix the same on the transferring material, and the like.

When the image information is supplied from the scanner 102 or the external device, laser beam which has been modulated according to the image information is irradiated from the exposing device 105 on the photosensitive drum 106 which has been charged at a predetermined potential.

Thereby, an electrostatic latent image corresponding to an image to be reproduced is formed on the photosensitive drum 106.

Toner is selectively supplied from the developing device 107 to the electrostatic latent image which has been formed on the photosensitive drum 106 for developing, and the developed (toner) image is transferred on a sheet or paper P supplied from a cassette described later by an electrical field provided from a transferring device which is not described in detail.

The toner image which has been transferred on the sheet P is conveyed to the fusing device 101 where it is fused and fixed on the paper P.

The sheets P are taken out one by one from one of paper feeding cassettes 109a and 109b provided below the photosensitive drum 106 by corresponding one of pickup rollers 108, the taken-out paper P is conveyed to an aligning roller 111 for aligning (registering) a sheet to a toner image (developer image) which has been formed on the photosensitive drum 106 through a conveying path 110 extending towards the photosensitive drum 106, and the paper P is conveyed in a predetermined timing at a transferring position where the photosensitive drum 106 and the transferring device are opposed to each other.

The paper P on which the toner image has been fused or fixed by the fusing device 101 is ejected to a paper ejection space (paper ejection tray) 113 defined between the scanner 102 and the cassettes 109a, 109b by a paper ejection roller 112. Incidentally, an automatic duplex unit (ADU) 114 for reversing a paper whose one side surface has been fused with an image as necessary is provided between the fusing device 101 and the cassettes 109a, 109b.

Figure 6:
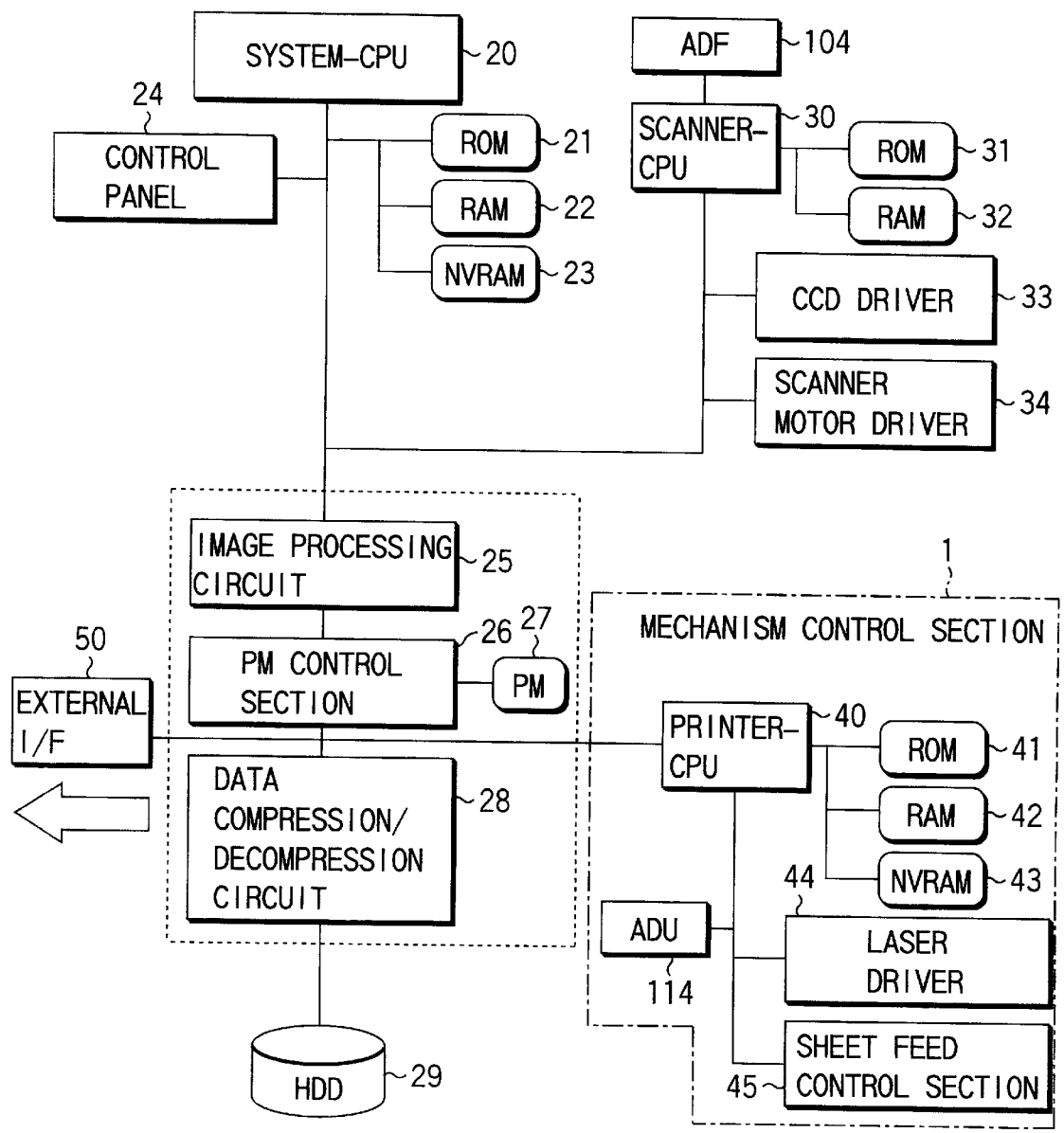
FIG. 6 is a block diagram schematically showing a configuration of a control system of the digital reproducing apparatus.

FIG. 6 schematically shows electrical connections in the digital reproducing apparatus 100 and a signal flow for controlling the digital reproducing apparatus 100. The digital reproducing apparatus 100 is configured with three CPUs of a system CPU (SYSTEM-CPU) 20, a scanner CPU (SCANNER-CPU) 30 of the scanner 102, and a printer CPU (PRINTER-CPU) 40 of the image forming section 103.

The system CPU 20 turns on a LED/displays character series on a liquid crystal display (LCD) according to operations from a control panel 24, performs operation control in response to the operations and issues instructions to the scanner CPU 30 and the printer CPU 40.

Also, the system CPU 20 receives states of the scanner CPU 30 and the printer CPU 40 through serial communication therefrom to display the states. The scanner CPU 30 and the printer CPU 40 perform control on respective driving devices according to instructions from the system CPU 20.

Connected to the system CPU 20 are a ROM 21, a RAM 22, a NVRAM (nonvolatile RAM) 23, the control panel 24, an image processing circuit 25, a page memory control section (PM control section) 26, a page memory (PM) 27, a data compression/decompression circuit 28, and a hard disk device (HDD) 29. Also, the system CPU 20 includes an external interface (external I/F) 50 for connection to an external device(s).

The system CPU 20 is for controlling the entire of the digital reproducing apparatus 100. The ROM 21 stores a control program therein. The RAM 22 is for storing data temporarily therein. The NVRAM 23 is a nonvolatile memory backed up by a battery (not shown), and it saves data on the NVRAM 23 when power is turned off.

The image processing circuit 25 is for performing image processing corresponding to image data. The page memory control section 26 is for storing image data in the page memory 27 and reading out the same therefrom. The page memory 27 has an area where image data corresponding to a plurality of pages can be stored and which is formed to be capable of storing data obtained by compressing image data for each page. The data compression/decompression circuit 28 is for compressing image data and decompressing the compressed image data. The hard disk device 29 is for storing various data as memory means.

Connected to the scanner 30 are a ROM 31 where a control program and the like are stored, a RAM 32 for storing data therein, a CCD driver 33, a scanner motor driver 34 for controlling rotation of a motor, and an automatic document feeder (ADF) 104.

Connected to the printer CPU 40 are a ROM 41 where a control program and the like are stored, a RAM 42 for storing data therein, a NVRAM 43 which is a nonvolatile memory, a laser driver 44 for turning on/off a semiconductor laser (not shown), a sheet or paper feeding control section 45 for control sheet or paper feeding, and an automatic duplex unit (ADU) 114.

The mechanism control section 1 is configured with the printer CPU 40, ROM 41, RAM 42, NVRAM 43, laser driver 44, sheet feed control section 45 and ADU 114.

FIG. 7 shows a relationship between a task configuration and the mechanism control section 1 of the digital reproducing apparatus 100.

The digital reproducing apparatus 100 is modularized in an input/output control task 2, an input/output (I/O) control task 3, a print control task 4, an engine control task 5, and the like, as shown in FIG. 7. Information such as commands, states and the like is transmitted/received between the respective tasks through messages. The engine control task 5 has a command queue 6 where commands issued from upper tasks are saved temporarily, and it adjusts transmission/reception of the commands according to the state of the mechanism control section 1 for actually controlling respective mechanical portions.

A precedent pre-output processing of a print start command in the digital reproducing apparatus 100 of the present invention can be realized by temporarily saving a print start command in the command queue 6 in the engine control task 5 and transmitting a next sheet feed start command immediately after a sheet feed termination command of a sheet which is now being processed is received from the mechanism control section 1.

Also, the digital reproducing apparatus 100 of the present invention performs the precedent pre-output of a print start command even when sheet feed positions are changed or switched corresponding to a preceding sheet and a following sheet in such a case where printing is performed in a cover sheet mode or printing is performed using the ADU 114. In this case, the digital reproducing apparatus 100 does not transmit the command which has been precedently pre-output at a time of occurrence of sheet empty error to the mechanism control section 1 and notifies the print control task 4 of no transmission of the re-output command as cancellation of the print start command. Thereby, the next sheet can be prevented from being printed at a time of occurrence of sheet empty.

FIG. 8 shows a sequence of a precedent pre-output control executed when sheet empty occurs in a case where sheet feed positions are changed. FIG. 8 shows an example of a sequence where sheets for (1) and (2) pages are supplied from the cassette 109a and a sheet for (3) page is supplied through a sheet insertion.

Operation of the digital reproducing apparatus 100 according to the present invention will be explained in detail below.

Figure 1:
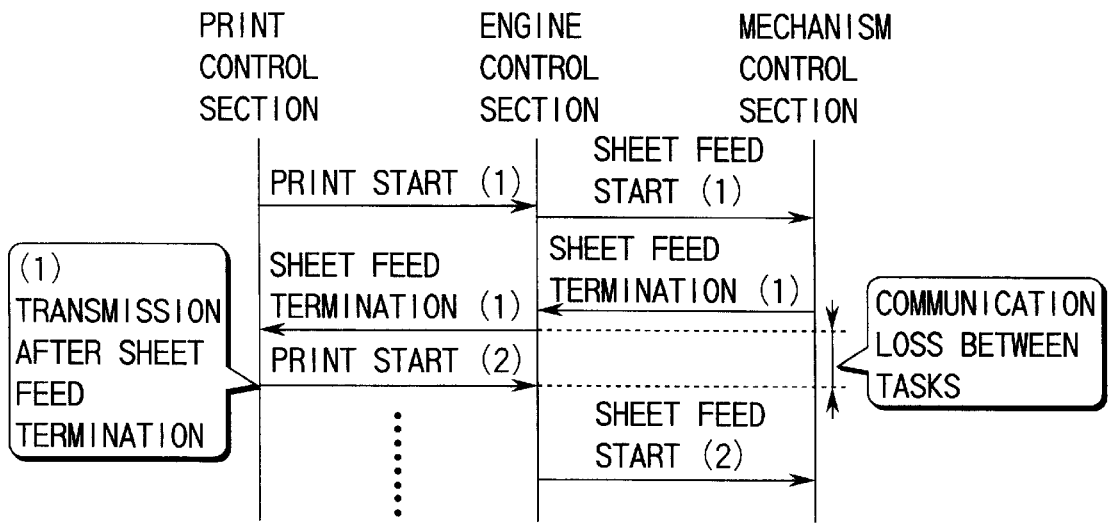
FIG. 1 is a diagram showing a sequence of a print start executed when a precedent pre-output is not performed.
Figure 2:
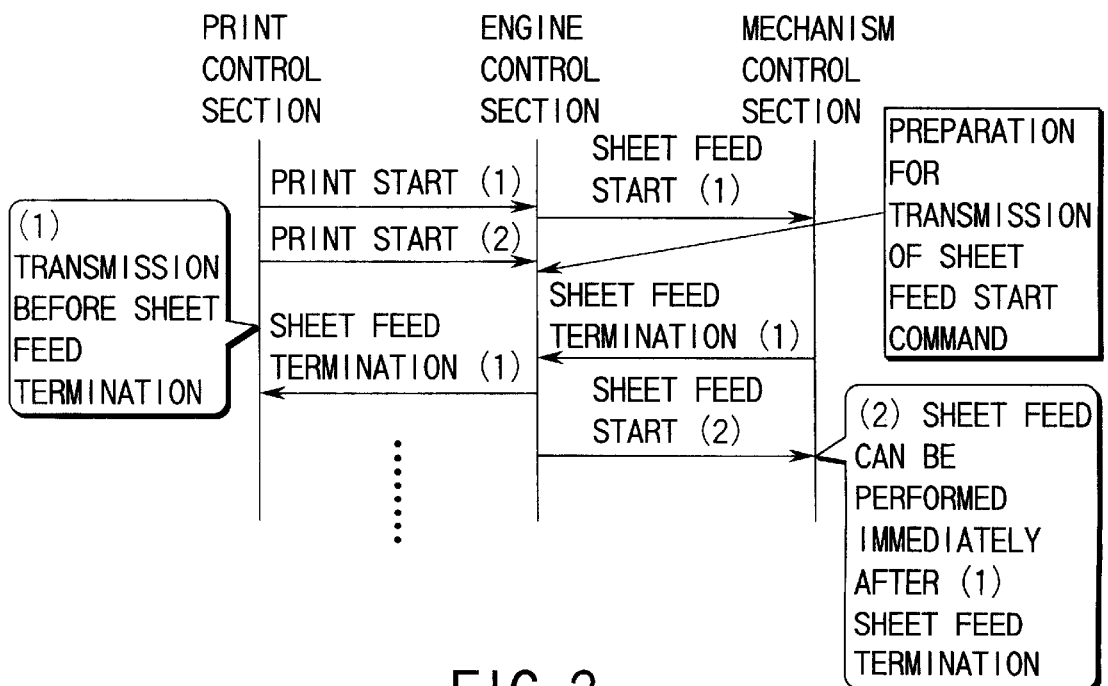
FIG. 2 is a diagram showing a sequence of a print start executed when a precedent pre-output is performed.
Figures 3, 4:
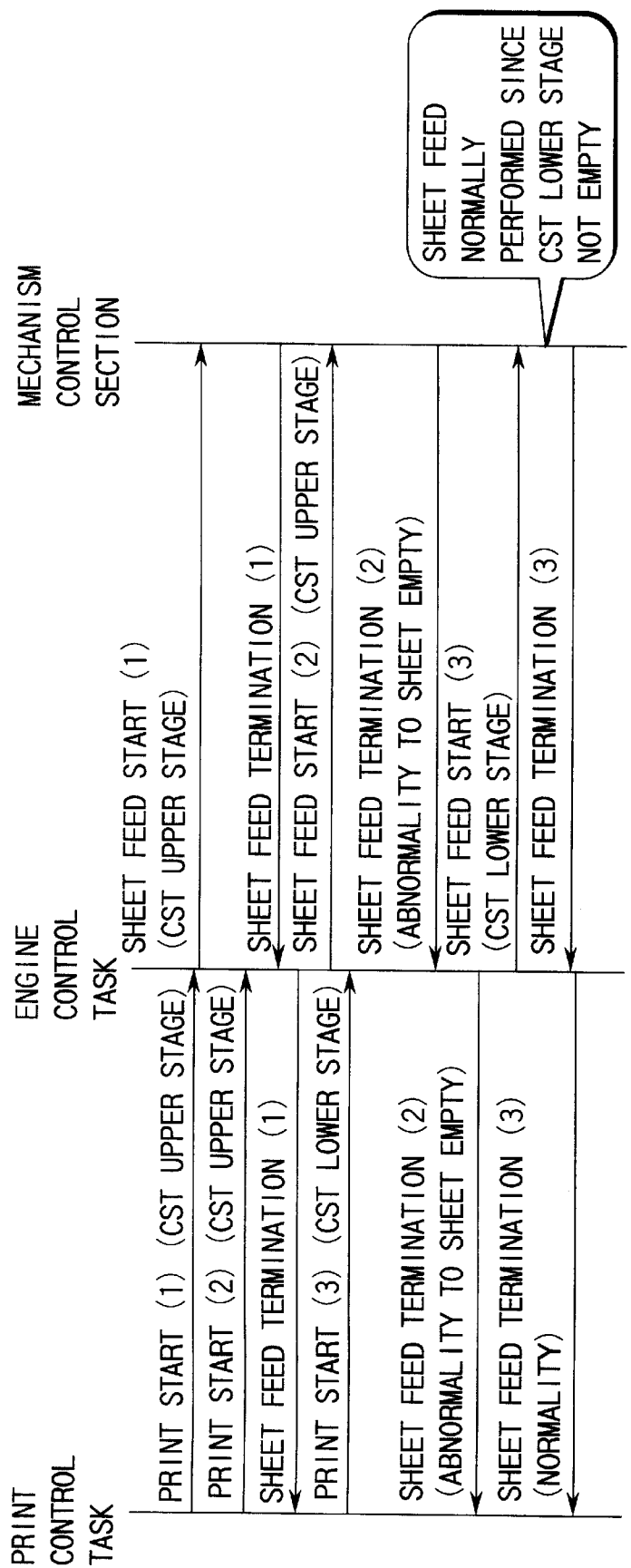
FIG. 3 is a diagram showing a sequence of a precedent pre-output control executed when a sheet empty state occurs in a case of a sheet feed position change.
FIG. 4 is an example showing a printing order of a duplex printing performed by using a stackless type automatic duplex unit.
Figure 9:
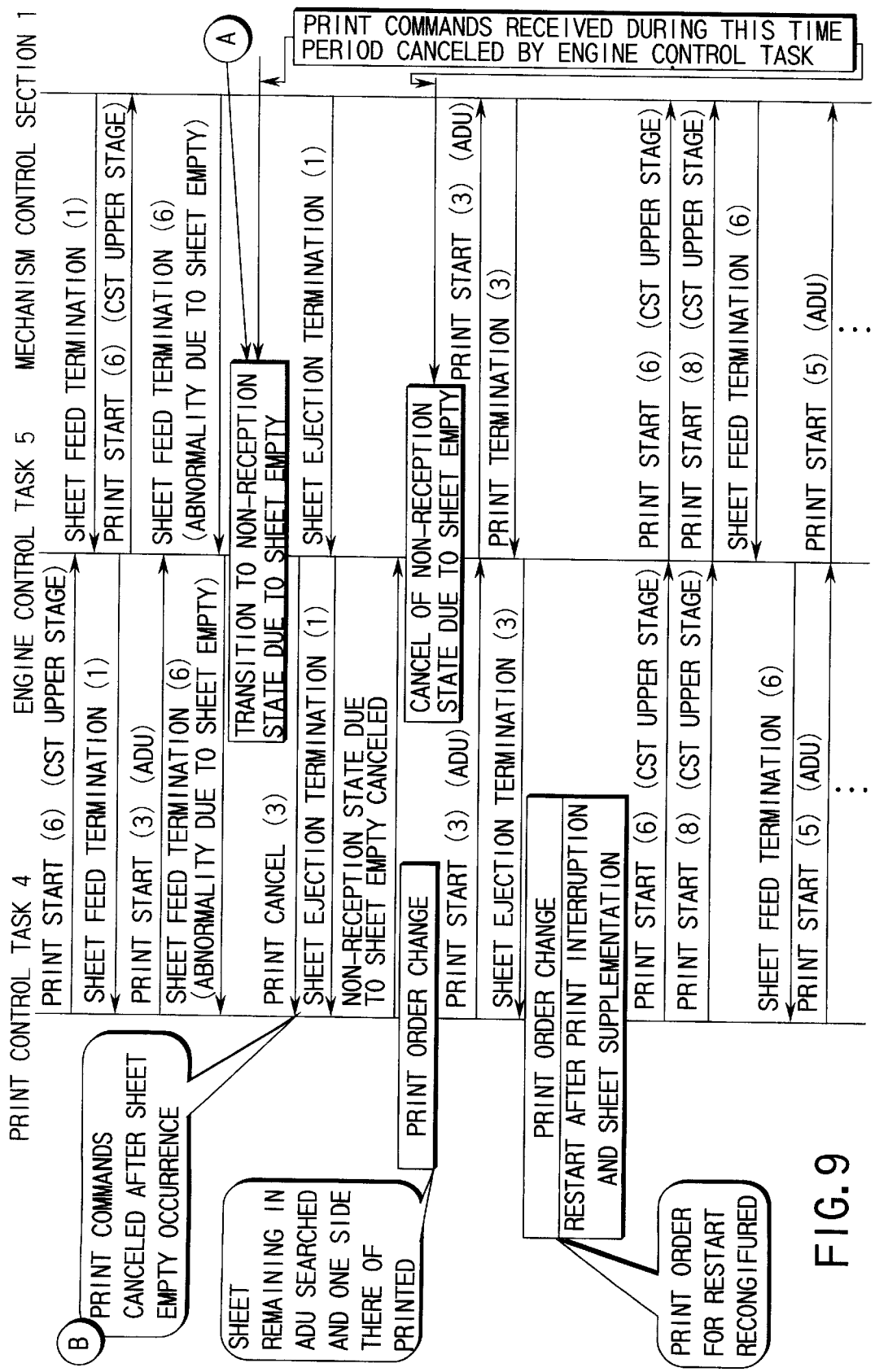
FIG. 9 is a diagram showing a sequence executed when a sheet empty state occurs in a case where an automatic duplex unit according to the present invention is used.

FIG. 9 shows a sequence executed at a time of occurrence of sheet empty in case that a duplex alternative printing control is performed using the ADU 114 in the present invention. A printing order is the same as that shown in FIG. 4. FIG. 4 shows a case where sheet empty occurs at a time of printing a sheet for (6)th page (the $4^{th}$ sheet printing).

Also, FIG. 9 shows a processing performed from a time of termination of feeding a sheet for (1)th page from the ADU 114 up to printing restart through a printing interruption of a sheet for (6)th page due to sheet empty. In the digital reproducing apparatus 100 of the present invention, a precedent pre-output processing of a print command is performed even when changing or switching is performed from one of the sheet feed cassettes to the other corresponding to a preceding sheet and a following sheet.

When the engine control section 5 receives an abnormal termination command to a sheet feed start command for (6)th page due to sheet empty from the mechanism control section 1 (at a time point A), the engine control task 5 has received a print start command for (3)th page which has been precedently pre-output from the print control task 4 to save the same in the command queue 6 and has completed preparation for transmission of the print start command for (3)th page.

When the engine control task 5 receives a message indicating the abnormal termination to the sheet feed start command for (6)th page due to sheet empty, it transits to a print start command non-reception state (status) due to sheet empty. Then, the engine control task 5 does not transmit the commands which have been registered in the command queue 6 and print start commands which have been received thereafter to the mechanism control section 1, and it notifies the print control task 4 that sheet feed has not been performed as print start cancellation (at a time point B). When the print control task 5 receives the abnormal termination for (6)th page due to sheet empty, it instructs the engine control task 5 to cancel the print start command non-reception state due to sheet empty. Then, the print control task 4 searches for a sheet to be printed before the printing interruption. When such a sheet is found out, a printing processing is performed on the sheet. Thereafter, the printing order is rearranged for the remaining pages and the printing processing transits to a printing interruption state.

At the time point B in the example shown in FIG. 9, since there exists a sheet whose one side has been printed with (4)th page, an image for the other side (surface) of the sheet is searched for, and a printing processing for the image is performed. The print control task 4 to be printed before the interruption reconfigures or rearranges a printing order for restart for the remaining pages except for the (1) to (4) pages.

Figures 10, 11:
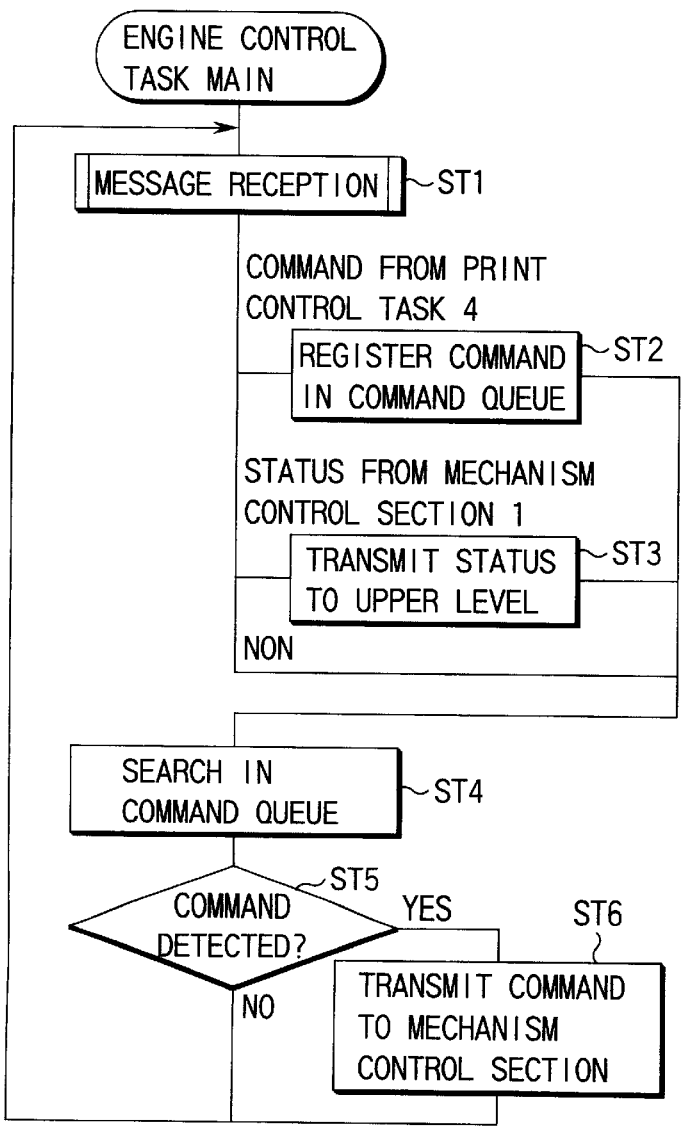
FIG. 10 is a diagram showing an example of a printing order change of the duplex printing performed at a sheet empty interruption time.
FIG. 11 is a flowchart for explaining operation of a main section of an engine control task in the digital reproducing apparatus.

FIG. 10 shows an example of a printing order change of duplex printing at a time of printing interruption due to sheet empty for the (6) page. After sheets are supplemented in a sheet feed cassette by an operator and a sheet empty state is cancelled, printing processing is restarted in the reconfigured printing order (set after change) from the printing order set before change.

Thus, when sheet empty occurs, a print start command is cancelled once irrespective of commands which has been precedently pre-output and presence/absence of sheets at a sheet feed position corresponding to the following print start commands, and the printing order is reconfigured and the printing processing is interrupted, so that an interruption processing can be performed normally even when sheet empty occurs during printing job where sheets are supplied from a plurality of sheet feed cassettes in a mixed manner.

Next, operation of a main section of the engine control task 5 in the digital reproducing apparatus 100 will be explained with reference to a flowchart shown in FIG. 11.

The engine control task 5 is divided or segmented in a message receiving section and a command execution section. The message receiving section receives messages from an upper level to a lower level (ST1), analyzing the same to register commands in the command queue 6 (ST2), and performs state transmission (ST3). The command execution section performs command processing which has been registered in the command queue 6 (STs 4, 5 and 6). The engine control task 5 performs the massage receiving processing and the command performing processing in an alternating manner.

Figure 12:
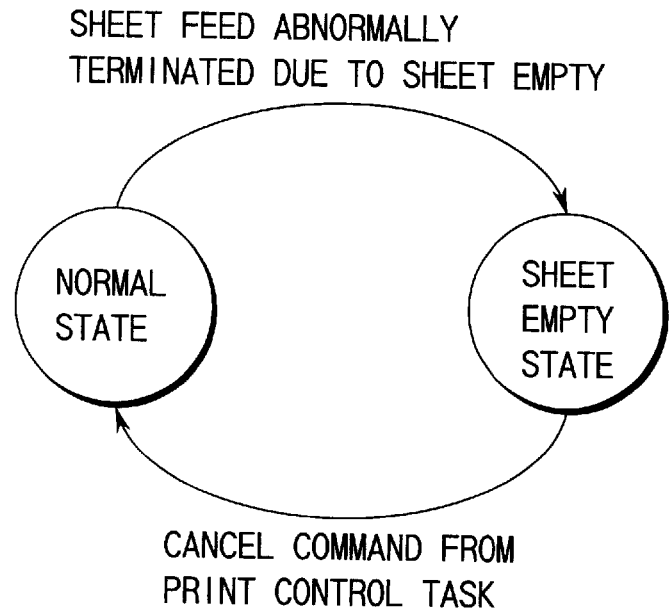
FIG. 12 is a diagram showing a state transition of the engine control task in the digital reproducing apparatus.

FIG. 12 shows a state (status) transition of the engine control task 5 in the digital reproducing apparatus 100. As shown, when the engine control task 5 receives an abnormal termination due to sheet empty from the mechanism control section 1, the processing transitions to a print start command non-reception state due to sheet empty, and it returns back to a normal state by a cancel command for canceling the print start command non-reception state due to sheet empty issued from the print control task 4.

Figure 13:
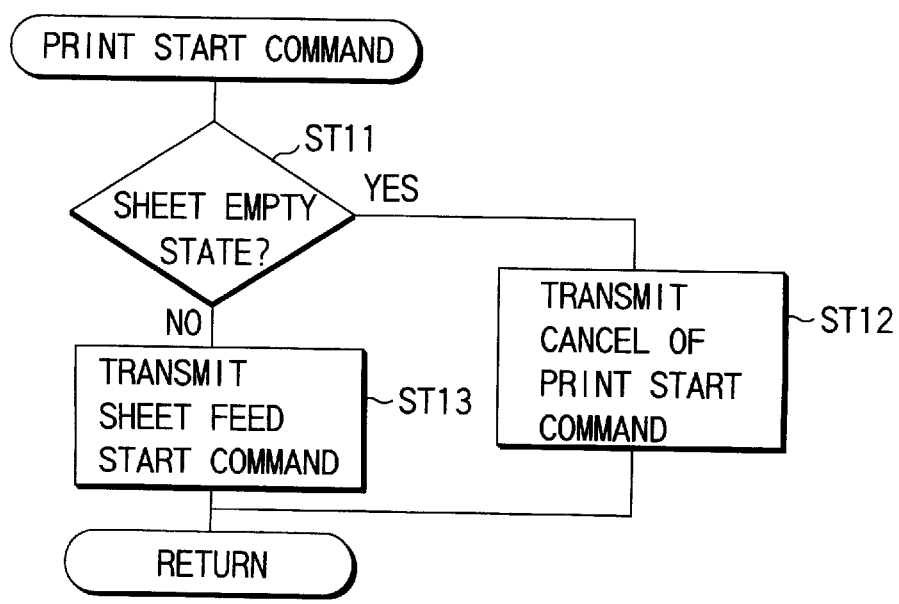
FIG. 13 is a flowchart for explaining a command executing processing of a command executing section in the engine control task.

FIG. 13 is a flowchart of a command execution processing executed when a print start command has been registered in the command queue 6 in the command execution section in step ST6 shown in FIG. 6.

First, when a print start command execution processing is called, a determination is made about whether the current engine control task 5 is in a normal mode or in a command non-reception state due to sheet empty (ST11). When the engine control task 5 is in the command non-reception state, a message for printing cancellation is transmitted to the print control task 4 (ST12). When the engine control task 5 is in the normal mode, a sheet feed start command is transmitted to the mechanism control section 1 (ST13).

Figure 14:
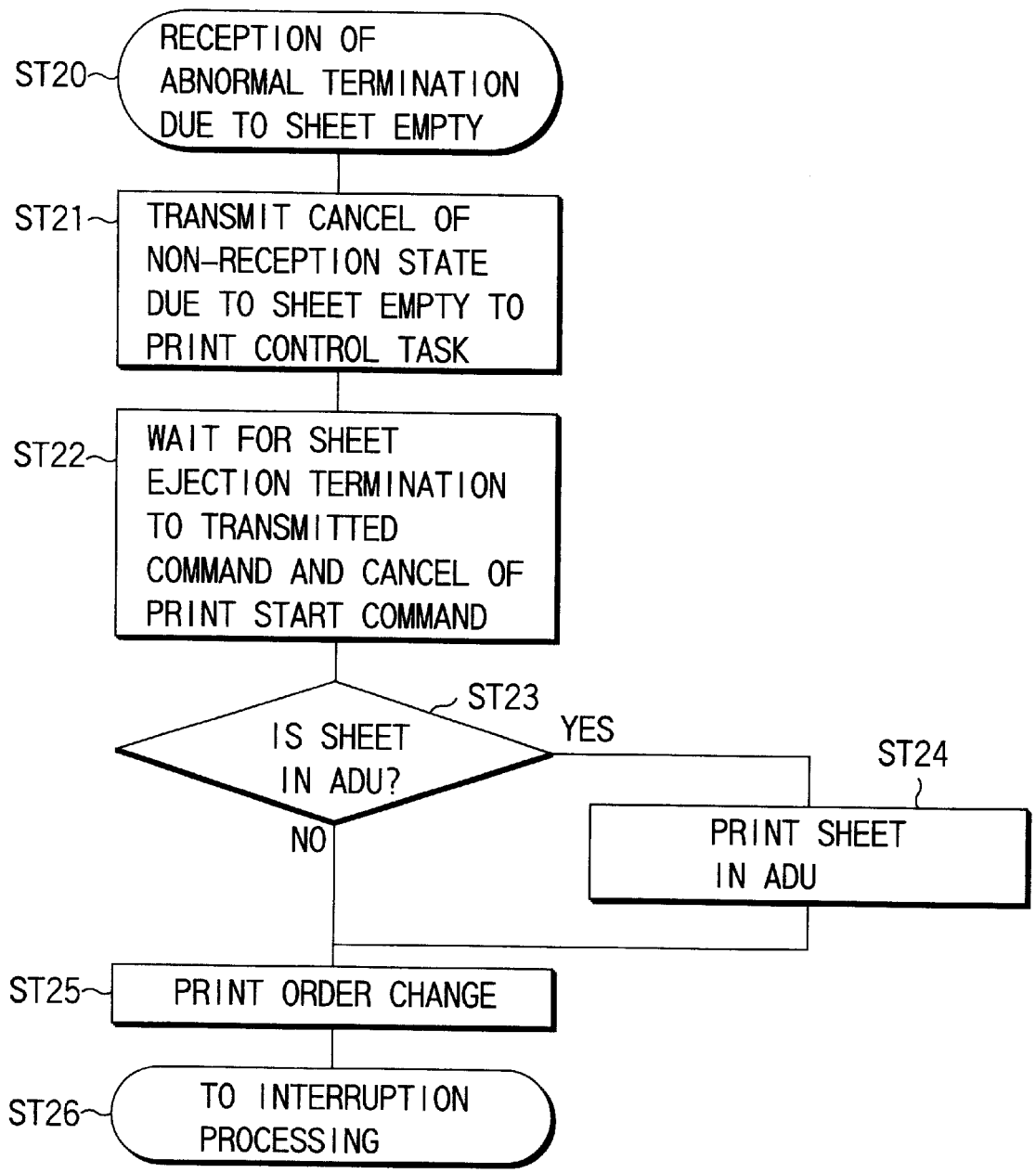
FIG. 14 is a flowchart for explaining operations performed when a sheet empty abnormal termination command of a print control task is received.

FIG. 14 shows a flowchart of operation performed when the print control task 4 receives an abnormal termination due to sheet empty. When the print control task 4 receives the abnormal termination due to sheet empty (ST20), it transmits a non-reception state release command to the engine control 5 (ST21). Next, the print control task 4 waits for reception of a message indicating a print completion about transmitted print start command or a message indicating a cancellation of the print start command (ST22). Thereafter, the print control task 4 determines whether or not there is a sheet in the ADU 114 (ST23). When the answer is yes, printing is performed on the sheet in the ADU 114 (ST24). Then, the print control task 4 reconfigures the printing order except for the printed pages (ST25) and the processing transits to a stop or interruption processing (ST26).

As mentioned above, according to the embodiment according to the present invention, when a sheet empty occurs, print start commands issued thereafter are cancelled and the printing order is reconfigured, so that a printing speed can be improved by precedently pre-outputting print start command while realizing a interruption processing due to sheet empty in a continuous job where a sheet feed position is changed.

What is claimed is:

1. An image forming apparatus comprising:
    image forming means for forming an image on a sheet which is fed on the basis of image data;
    operation control means for controlling operations of the image forming means including a sheet feed operation responding to a sheet feed start command, when the sheet feed start command is received;
    first control means for precedently pre-outputting a next image forming start command for forming an image in the image forming means before a sheet feed termination command is received output from the operation control means; and
    second control means for registering the next image forming start command in a command queue when the next image forming start command is received output from the first control means, outputting another sheet feed start command to the operation control means in response to the next image forming start command which has been registered in the command queue when a sheet feed termination command is received output from the operation control means, and outputting a cancel command to the first control means for canceling the next image forming start command which has been registered in the command queue when a sheet feed abnormal termination message is received form the operation control means.

2. An image forming apparatus according to claim 1, wherein the image forming means is a printer.

3. An image forming apparatus according to claim 1, wherein the operation control means comprises control sections of respective mechanisms configuring the image forming apparatus.

4. An image forming apparatus according to claim 1, wherein, when the second control means receives the sheet feed abnormal termination message, the second control means transits to an image forming start command non-reception state.

5. An image forming apparatus according to claim 1, wherein, when the first control means receives the abnormal termination due to sheet empty, the first control means transmits a non-reception state release command to the second control means.

6. An image forming apparatus according to claim 1, wherein, the second control means returns back to a normal state by a cancel command for canceling the image forming start command non-reception state due to sheet empty issued from the first control means.

7. An image forming apparatus according to claim 1, wherein, when the first control means receives the abnormal termination due to sheet empty, the first control means transmits a non-reception state release command to the second control means and waits for reception of an image forming completion command or a cancel command for canceling the image forming start command from the second control means.

8. An image forming apparatus according to claim 1, wherein, when the first control means receives the sheet feed abnormal termination command due to sheet empty and receives an image forming completion command corresponding to the image forming start command of the precedent pre-output or a cancel command for canceling the image forming start command thereof, the first control means confirms whether or not there is a sheet in an automatic duplex unit provided in the image forming apparatus, and performs control on image forming using the sheet when there is the sheet.

9. An image forming apparatus according to claim 1, wherein, when the first control means receives the sheet feed abnormal termination command due to sheet empty and receives an image forming completion command corresponding to the image forming start command of the precedent pre-output or a cancel command for canceling the image forming start command thereof, the first control means confirms whether or not there is a sheet in an automatic duplex unit provided in the image forming apparatus, and performs control on image forming using the sheet when there is the sheet, while reconfigures an image forming order for the remaining job except for the job where the image forming has been completed immediately when there is no sheet.

10. An image forming apparatus according to claim 1, further comprising a stackless type automatic duplex unit.

11. An image forming apparatus according to claim 1, further comprising a stackless type automatic duplex unit, wherein duplex alternative print control for a sheet which is a medium to be formed with an image is performed.

12. An image forming method comprising:
- a first step of controlling image forming operations including a sheet feed operation responding to a sheet feed start command when the sheet feed start command is received;
- a second step of precedently pre-outputting a next image forming start command before a sheet feed termination command output as a result of control of the paper feeding operation in the first step;
- a third step of registering the next image forming start command in a command queue when the next image forming start command which has been precedently pre-outputted in the second step is received;
- a fourth step of outputting another sheet feed start command responding to the next image forming start command which has been registered in the command queue in the third step when a sheet feed termination command output as a result of the sheet feed operation in the first step is received; and
- a fifth step of canceling the next image forming start command which has been registered in the command queue in the third step when a sheet feed abnormal termination message output as a result of the sheet feed operation in the first step is received.

* * * * *